United States Patent
Paulus et al.

[11] 4,066,328
[45] Jan. 3, 1978

[54] IRRADIATING SYSTEM FOR LINE-BY-LINE COPIER

[75] Inventors: Rudolf Paulus, Munich; Walter Gutmann, Lochhofen; Wilfried Hofmann, Taufkirchen, all of Germany

[73] Assignee: AGFA-Gevaert, AG, Leverkusen, Germany

[21] Appl. No.: 681,032

[22] Filed: Apr. 28, 1976

[30] Foreign Application Priority Data
Apr. 30, 1975 Germany .............................. 2519283

[51] Int. Cl.² ............................................. G02B 27/17
[52] U.S. Cl. ........................................ 350/7; 350/285; 358/84
[58] Field of Search ............................ 350/6, 7, 285; 178/6.7 R; 250/234–246; 355/34–38; 358/84

[56] References Cited
U.S. PATENT DOCUMENTS 3,729,248   4/1973   Beduchaud ............................ 350/7
3,823,276   7/1974   Maslowski et al. .............. 178/6.7 R Primary Examiner—John K. Corbin
Assistant Examiner—B. W. delos Reyes
Attorney, Agent, or Firm—Michael J. Striker

[57] ABSTRACT

Light is projected as a beam from a fixed laser source onto a helical reflecting surface continuously rotating about its central axis. The beam impinges the reflecting surface in an incident direction substantially parallel to the rotation axis and is reflected from the surface in a direction skew to this axis. A reflector extending the full axial length of the reflecting surface then reflects the beam back onto the reflecting surface in a direction so oriented that the reflecting surface reflects the beam a second time, but now in a direction generally perpendicular to the axis of rotation. The reflecting surface and the reflector are both concave so as to condense the beam.

10 Claims, 1 Drawing Figure

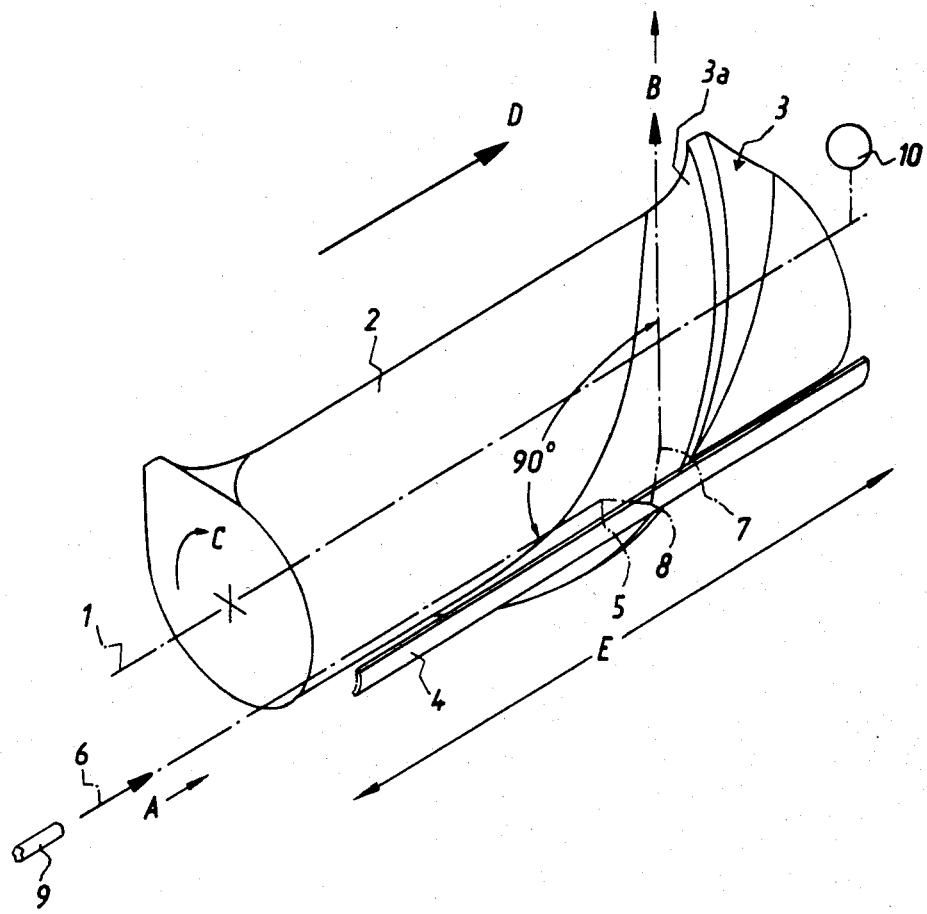

IRRADIATING SYSTEM FOR LINE-BY-LINE COPIER

BACKGROUND OF THE INVENTION

The present invention relates to a method of and apparatus for irradiating an object. More particularly this invention concerns a system usable in a copying apparatus for irradiating a line of a master to be copied.

It is known to cause a beam of light to travel along a line of a master to be copied by projecting the beam of light from a fixed light source against a helical reflecting surface. This surface is formed so that the reflected light travels along the line to be copied.

It is known to form the mirror as a drum having a helical ridge one of whose side surfaces is reflective. In the simplest arrangement the side surfaces extend perfectly radially of the rotation axis of the drum and the helix runs at a 45° pitch. Thus the light is reflected exactly perpendicularly by the mirror.

Such an arrangement has the considerable disadvantage that it is very difficult to make the mirror and machine this helical ridge on it.

For this reason the helical reflecting surface is usually formed so as not to extend exactly radially, by which is meant it is not formed of a family of lines extending radially of the axis. Thus the beam is reflected by the surface in a direction generally not lying in a plane orthogonal to the central axis of the helix which is also the axis about which the mirror is rotated. With the system described immediately above the light is incident upon the master or the copy carrier which is arranged in a plane parallel to the rotation axis of the scanning mirror at an angle which differs from the right angle. Thus image sharpness is considerably reduced and copy quality is similarly adversely affected.

In addition, when the beam is not deflected in a direction lying in a plane orthogonal to the central axis, the master or the copy carrier must be displaced in an axial direction with respect to the scanning mirror. Such displacement is disadvantagous in many apparatuses, because it increases the size and the cost of the machine. Also, for symmetry reasons or reasons of beam direction this axial displacement is often undesirable.

An exemplary scanning system according to the prior art can be seen in German published patent specification No. 2,131,467 naming as inventor M. M. Beduchaud.

SUMMARY OF THE INVENTION

It is therefore an object of the present invention to provide an improved method of and apparatus for irradiating.

Another object is the provision of an improved scanning system and method which overcomes the above-given disadvantages.

Yet another object is to provide a scanning system comprising a helical reflecting surface rotating about its axis and being inclined with respect to radials of this axis, the scanning system deflecting a beam incicent in a direction substantially parallel to the axis into a direction lying in a plane orthogonal to this axis.

These objects are attained according to the present invention in an arrangement of the above-described general type wherein a reflecting mirror is provided next to the helical rotating scanning surface. This reflecting mirror extends the full axial length of the helical scanning surface and is arranged so that a beam travelling parallel to the axis of rotation of the helical surface and reflected by a portion of the same onto the reflecting mirror, is in turn reflected by the same back on to the reflecting surface in a direction so oriented that this beam is again reflected by the surface and emerges in a direction generally perpendicular to the rotation axis of this surface. Thus it is possible to provide an elongated reflector fixed next to the reflecting drum and to therefore obtain a very compact system which even with a non-radial reflecting surface can serve to cause a beam of light issuing from a fixed light source to be reflected in such a manner that the emergent beam is incident upon the master or the copy carrier at a right angle. The inclination of the reflected beam normally caused by its reflection off such a non-radial surface is completely cured in accordance with the invention by a second reflection off the surface which will inherently be complementary to the first reflection and, therefore, cancel out whatever inclination was imparted to the beam.

In accordance with the present invention the beam is condensed after reflection from the surface the first time. This may be effected by means of a bar lens between the mirror and the reflector, or the reflector may be formed itself as a concave surface.

In accordance with yet another feature of this invention the reflecting surface of the mirror is similarly concave so that a double condensation of the beam is achieved. When a high-intensity laser beam is used this makes it possible to obtain an extremely well focused and powerful irradiation so that copy quality is improved to the maximum.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

BRIEF DESCRIPTION OF THE DRAWINGS

The sole FIGURE of the drawing shows in largely schematic form the apparatus for carrying out the method according to the present invention.

DESCRIPTION OF THE PREFERRED EMBODIMENT

As shown in the drawing a mirror 2 is rotatable by means of a motor 10 about its central axis1 and has centered on this axis 1 a helical ridge 3 formed on at least one surface with a concave reflecting surface 3a. This surface 3a is highly mirrored and curved so that it does not lie along radii of the axis 1.

A laser light source 9 generates a beam 6 in an incident direction A which is parallel to the axis 1 so that this beam 6 impinges the surface 3a at 5. From 5 the beam 6 is reflected outwardly in a direction skew to the axis 1.

In accordance with the present invention an elongated part-cylindrical reflector 4 extends parallel to the axis 1 at a location radially offset from the mirror 2. The reflector 4 is fixed relative to the mirror 2 and has an inner concave surface facing toward the axis 1 and so aligned as to receive the beam 6 which is reflected from the surface 3a at the location 5. This beam, skew to the axis 1, is useless for the intended purpose. In accordance with the invention, it must be made to emerge in a direction B which lies in a plane perpendicular to to the direction A and to the axis 1. This is achieved by provision of the mirror 4 which reflects the beam at 8, back upon the surface 3a at location 7, but at a much steeper angle of incidence than the angle at which the beam 6 originally impinged the surface 3a at 5. From the location 7, which is spaced from the location 5, the beam 6 is again reflected, this time in the desired direction B.

Thus, as the motor 10 rotates the mirror 2 in the direction indicated by arrow C, the emergent light beam 6 is shifted in the axial direction indicated by arrow D. Since the mirror 4 has an axial length E equal to the full axial length of the mirror 2 the emerging light beam 6 will be shifted along a path which extends parallel to the axis 1.

It will be understood that each of the elements described above, or two or more together, may also find a useful application in other types of structures differing from the types described above.

While the invention has been illustrated and described as embodied in an irradiating system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An irradiating apparatus for a copier, said apparatus comprising: a mirror having a substantially helical reflecting surface centered on a central axis and inclined to radii of said axis; means for rotating said mirror about said axis; means including a fixed light source for casting a beam of light in an incident direction generally parallel to said axis onto said mirror, whereby said beam is reflected from said surface in a first reflection direction outwardly of said axis; and means including a reflector extending the full axial length of said surface and fixed adjacent said mirror for reflecting the reflected beam back onto said surface in a second reflection direction so that said beam is again reflected by said mirror in a third reflection direction lying in a plane substantially orthogonal to said axis.

2. The apparatus defined in claim 1, wherein said mirror is a drum centered on said axis and formed with a helical ridge having said surface.

3. The apparatus defined in claim 1, wherein said surface is concave.

4. The apparatus defined in claim 1, further comprising means for condensing said beam after its first reflection from said surface.

5. The apparatus defined in claim 1, wherein said reflector is concave toward said axis.

6. The apparatus defined in claim 1, wherein said reflector is concave toward said axis and said surface is concave.

7. The apparatus defined in claim 1, wherein said source is a laser-beam generator.

8. In a scanning method wherein light is projected as a beam from a fixed source onto a helical reflecting surface rotating about and inclined to radii of its central axis in an incident direction substantially parallel to said axis and is reflected from said surface in direction outwardly of said axis, the improvement comprising the step of reflecting the reflected beam back onto said reflecting surface in a direction so oriented that said beam is again reflected by said surface in a direction lying in a plane substantially orthogonal to said axis.

9. The improvement defined in claim 8, further comprising the step of condensing the reflected beam.

10. The improvement defined in claim 8, wherein said beam is reflected the first time by said surface in a direction skew to said axis.

* * * * *